Feb. 28, 1961　　　G. SANDEFUR　　　2,973,210
KINGPIN ASSEMBLY
Filed May 15, 1959
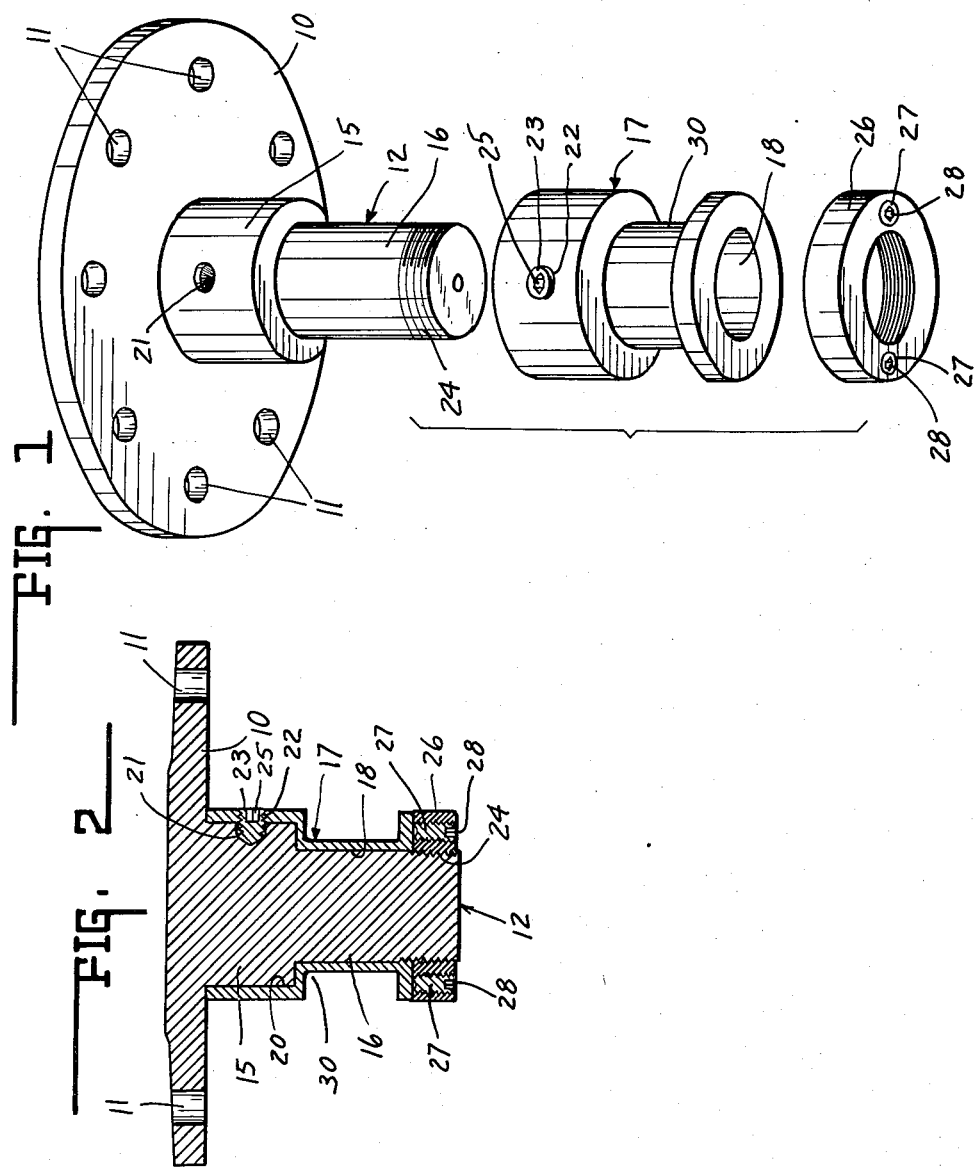
INVENTOR.
GEORGE SANDEFUR.
BY
Lockwood, Woodard, Smith & Weikart.
ATTORNEYS.

2,973,210
Patented Feb. 28, 1961

2,973,210

KINGPIN ASSEMBLY

George Sandefur, Indianapolis, Ind., assignor to Bill Anderson Spring Service, Inc., a corporation of Indiana Filed May 15, 1959, Ser. No. 813,480

4 Claims. (Cl. 280—433)

The present invention relates to an improved kingpin assembly for detachably connecting a truck or tractor to a trailer.

It is an object of the present invention to provide an improved kingpin assembly.

According to conventional practice, the kingpin presently used on trailers is attached to the front end of the trailer and is provided with an annular slot in its outer periphery so it may be locked to the fifth wheel of the tractor. When the kingpin wears out it is cut away from the trailer and a new kingpin is welded thereto.

It is therefore an object of the present invention to provide a kingpin in which it is unnecessary to cut the kingpin away from the trailer for replacement when the kingpin becomes worn.

A further object of the present invention is to provide a kingpin assembly which is of solid construction and which may be easily and quickly assembled and disassembled.

Still a further object of the present invention is to provide a kingpin assembly which will not become disassembled and will withstand the rigorous abrasion and wear to which such kingpins are subjected.

Still further objects of the present invention will become apparent as the description proceeds.

The full nature of the invention will be understood from the accompanying drawings and the following description and claims:

Fig. 1 is an exploded, perspective view of a kingpin assembly embodying the present invention.

Fig. 2 is an axial sectional view of the kingpin assembly of Fig. 1.

Referring now to the drawings, I have illustrated my invention as comprising a disc 10 provided with a plurality of bores 11—11 arranged adjacent to the periphery of the disc 10 and in a circular pattern. The bores 11 accommodate bolts for attaching the disc 10 to the frame structure of a trailer. Integral with the disc 10 is a trunnion member indicated generally by the numeral 12 and projecting coaxially from the disc 10. The trunnion member 12 is formed, at its proximal portion 15, in a cylindrical shape and is formed at its distal portion 16 in a cylindrical shape having a reduced diameter relative to the diameter of proximal portion 15.

A sleeve 17 has a bore 18 which has a diameter approximately equal but slightly larger than the diameter of the distal portion 16 of the trunnion member 12. The sleeve 17 also has a counterbore 20 (Fig. 2) of a diameter and length approximately equal but slightly larger than the proximal portion 15 of the trunnion member 12. Thus the sleeve 17 may be received upon the trunnion member 12, as illustrated in Fig. 2, with the sleeve in a close fitting relation with the trunnion member and in such a manner that the sleeve and trunnion member have no hollow spaces in between. The relative diameters of the proximal portion 15 and the counterbore 20 and of the distal portion 16 and bore 18 should be such that the sleeve can be manually slid on to the trunnion member.

The proximal portion 15 of the trunnion member has an indentation 21 and the sleeve 17 has a threaded bore 22 for reception of a conically pointed set screw 23 for locking sleeve 17 against rotation with respect to the trunnion member 12. The screw 23 is provided with a hexagonal aperture 25 in its head to receive a wrench for rotating the screw. The length of the screw is such that when the screw is tightened down into the indentation 21 the head end of the screw is flush with or below the outer periphery of sleeve 17.

The distal portion 16 of the trunion member 12 is threaded at its end 24 for reception of a threaded cylindrical collar or nut 26. The outer diameter of the collar 26 is equal to the greatest outer diameter of the sleeve 17. The collar 26 is provided with a pair of threaded bores for reception of a pair of cup pointed set screws 27—27. The screws 27, which have wrench receiving hexagonal apertures 28—28 in their heads, are flush with or below the surface of the nut 26 when the screws are tightened down. When the kingpin construction is assembled as shown in Fig. 2, the screws 27 engage the sleeve 17 to prevent rotation of the nut with relation to the sleeve. The sleeve 17 is provided with an annular reduced bearing portion 30 in its outer periphery which is used to connect the kingpin assembly to the fifth wheel of a tractor in a conventional manner.

In assembling of the present device, the sleeve 17 is first slid on to the trunnion element 12 into the position illustrated in Fig. 2. The screw 23 is tightened down into the indentation 21 so as to prevent rotation of the sleeve 17 with respect to the trunnion element 12. The collar 26 is threaded on the threaded portion 24 of the distal end 16 of the trunnion member so as to hold the sleeve 17 on the trunnion member. The screws 27 are then tightened down against the sleeve 17 preventing rotation of the nut 26 with respect to the sleeve 17.

From the above description it will be obvious that the screws, nut, and the close fit relation of the trunnion member 12 and sleeve 17 combine to produce a solid kingpin assembly which will resist any tendency or force acting upon the kingpin assembly to disassemble the parts thereof. When the sleeve or bushing 17 becomes worn, however, it can be easily removed from the trunnion member 12 and replaced thus making unnecessary the present practice of cutting the kingpin from the trailer and welding a new kingpin to the trailer. Also, a replacement bushing 17 may be made oversize to fit a fifth wheel which may have become worn.

The invention claimed is:

1. A kingpin assembly for use in connecting a tractor and trailer which comprises a disc adapted to be connected to the trailer, a trunnion member fixed with relation to said disc and projecting coaxially thereof, a sleeve having an annular slot in its outer periphery, said sleeve received upon said trunnion member in close fit therewith, and a screw threadedly received in the wall of said sleeve and extending into said trunnion member for locking said sleeve against movement with respect to said trunnion member.

2. A kingpin assembly for use in connecting a tractor and trailer which comprises a disc adapted to be connected to the trailer, a trunnion member fixed with relation to said disc and projecting coaxially thereof, said trunnion member being formed with an indentation in its side wall, a sleeve received upon said trunnion member in close fit therewith, a screw threadedly received in the wall of said sleeve and extending into said indentation for locking said sleeve against rotation with respect to said trunnion member, a collar threadedly received upon the distal end of said trunnion member in abutment with said sleeve for retaining said sleeve upon said trunnion member, and means for locking said collar against rotation with respect to said sleeve for retaining the assembly in a rigid assembled relationship.

3. A kingpin assembly for use in connecting a tractor and trailer which comprises a disc adapted to be connected to the trailer, a trunnion member fixed with relation to said disc and projecting coaxially thereof, said trunnion member being formed with an indentation in its side wall, a sleeve received upon said trunnion member in close fit therewith, a screw threadedly received in the wall of said sleeve and extending into said indentation for locking said sleeve against rotation with respect to said trunnion member, said trunnion member having a threaded distal end projecting beyond the end of said sleeve, a collar received on the threaded end of said trunnion member abutting said sleeve for retaining said sleeve upon said trunnion member, and a pair of screws threadedly received within said collar and engaging said sleeve for preventing rotation of said collar with respect to said sleeve and for retaining the assembly in a rigid assembled relationship.

4. A kingpin assembly for use in connecting a tractor and trailer which comprises a disc having evenly spaced bores adjacent the periphery thereof adapting said disc for connection to a trailer, a trunnion member integral with said disc and projecting coaxially thereof, the proximal portion of said trunnion member having a cylindrical shape and the distal portion of said trunnion member having a cylindrical shape of reduced diameter relative to said proximal portion, a sleeve having a bore and counterbore therethrough of sizes corresponding to the sizes of said distal and proximal portions, respectively, of said trunnion member whereby said sleeve is received upon said trunnion member in close fitting relationship with said distal portion in said bore and with said proximal portion in said counterbore, said sleeve having an annular slot in its outer periphery, said proximal portion being formed with an indentation in its outer periphery, a screw threadedly received in the wall of said sleeve and extending into said indentation for locking said sleeve against rotation with respect to said trunnion member, said trunnion member having a threaded distal end projecting beyond the end of said sleeve, a collar received on the threaded end of said trunnion member abutting said sleeve for retaining said sleeve upon said trunnion member, and a pair of screws threadedly received within said collar and engaging said sleeve for preventing rotation of said collar with respect to said sleeve and for retaining the assembly in a rigid assembled relationship.

References Cited in the file of this patent

UNITED STATES PATENTS

| 2,219,415 | Fontaine | Oct. 29, 1940 |
| 2,355,042 | Billings | Aug. 8, 1944 |
| 2,838,324 | Dalton | June 8, 1958 |

FOREIGN PATENTS

| 214,723 | Australia | May 9, 1958 |
| 766,350 | France | Apr. 9, 1934 |